US011074307B2

(12) United States Patent
Walker et al.

(10) Patent No.: US 11,074,307 B2
(45) Date of Patent: Jul. 27, 2021

(54) AUTO-LOCATION VERIFICATION

(71) Applicant: Oracle International Corporation, Redwood Shores, CA (US)

(72) Inventors: Christopher Patrick Walker, Oakland, CA (US); Aurielle Perlmann, San Francisco, CA (US); Brandon Paul Barrette, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/865,241

(22) Filed: May 1, 2020

(65) Prior Publication Data

US 2021/0081463 A1 Mar. 18, 2021

Related U.S. Application Data

(60) Provisional application No. 62/900,344, filed on Sep. 13, 2019.

(51) Int. Cl.
*G06F 16/30* (2019.01)
*G06F 16/951* (2019.01)
*G06F 16/955* (2019.01)
*G06F 16/957* (2019.01)
*G06F 16/958* (2019.01)
*G06F 16/9535* (2019.01)

(52) U.S. Cl.
CPC .......... *G06F 16/951* (2019.01); *G06F 16/957* (2019.01); *G06F 16/958* (2019.01); *G06F 16/9535* (2019.01); *G06F 16/9566* (2019.01)

(58) Field of Classification Search
CPC .. G06F 16/951; G06F 16/9556; G06F 16/957; G06F 16/958; G06F 16/9535
USPC ........................................................ 707/709
See application file for complete search history.

(56) References Cited

U.S. PATENT DOCUMENTS

| | | | |
|---|---|---|---|
| 2005/0149507 A1* | 7/2005 | Nye | G06F 16/951 |
| 2014/0012854 A1* | 1/2014 | Suprasadachandranpilliai | ............ |
| | | | G06F 16/954 |
| | | | 707/740 |
| 2014/0122501 A1* | 5/2014 | Shen | G06Q 10/10 |
| | | | 707/748 |
| 2016/0337426 A1* | 11/2016 | Shribman | H04L 65/608 |
| 2019/0108286 A1* | 4/2019 | Pan | G06F 40/216 |

* cited by examiner

*Primary Examiner* — Kuen S Lu
(74) *Attorney, Agent, or Firm* — Invoke (57) ABSTRACT

Techniques for automatic extraction and verification of location data are disclosed. In some embodiments, a web crawler is configured to identify uniform resource locators (URLs), including a URL for a website associated with a target entity. The web crawler is further configured to fetch a subset of webpages from the website associated with the target entity. The web crawler may restrict the webpages that are fetched from the website based, at least in part, on patterns in the first website that are indicative of where reliable location information may be found. The web crawler further identifies a primary location of the target entity within at least one webpage in the subset of webpages, populating and/or verifying the primary location of the target entity in an entity profile. The entity profile may be consumed by client applications to execute location-aware and/or location dependent functions.

19 Claims, 6 Drawing Sheets

Q Search for keyword, company, conference, or list

Overview — 402

| | | |
|---|---|---|
| Exit Status | Employees ✓ | Founded Date |
| Subsidiary of Adobe inc | 1,000 | 2006 |
| Revenues | Total Funding | CEO Name |
| $241.4M | $126.64m USD / 8rounds | Philip Fernandez |
| SimilarWeb Rank | Parent | Industry category |
| 29,354 | Adobe inc | Information Technology |
| Address ✓ | | Industry Sub-Category |
| 901 Mariner Island BLVD Suite 500, San Mateo CA United States (US) 94404 | | Enterprise Software |

Marketo
- Marketo.com
- 14503762200
- Suggested Edits

Overview
- Signals
- Job Postings
- Corporate Hierarchy
- Similar Companies
- Salesforce Fields
- Salesforce Opportunities

[ADD TO LIST]

Description
Marketo inc is a software company focused on account based marketing, including email, mobile, social, digital arts, web management...
See More ˇ

Account Score: 770 (Tier1)
List update 09/05/2019
- 90 Technographics: Eloqua AND Salesforce
- 60. Firmographics: 501-2,000 employees
- 40. Sales Activity: 5+ leads associated to account
- 40. HG Data Technographics: Xactly (Sales performance mgmt. Over represented among DF and Eloqua Netsuite Mutual Customers)
- 35. Tech Stack: Marketo (integrates with Datafox)
- 35. Technographic = Salesforce
- 35. Conference Participations: Ops Stars San Francisco (2018)
- 35. Industry Categories: Enterprise Software
- 35. Conference: Gartner Digital Marketing Conference 2018 (Oracle Customers Over-Represented)
- 35. Conference: Marketing Technology Management (Mar Tech) San Francisco 2017 Oracle Customers Over-Represented)

AUTO-LOCATION VERIFICATION

BENEFIT CLAIM; RELATED APPLICATIONS; INCORPORATION BY REFERENCE

This application claims the benefit of U.S. Provisional Patent Application 62/900,344, filed Sep. 13, 2019, which is hereby incorporated by reference.

This application is related to U.S. Provisional Patent Application 62/900,575, titled "CONFIGURABLE PREDICTIVE MODELS FOR ACCOUNT SCORING AND SIGNAL SYNCHRONIZATION"; U.S. Ser. No. titled "15/824,833", titled "OPTIMIZATION OF ONLINE ADVERTISING ASSETS"; U.S. Ser. No. 14/791,105 titled "MANAGING PROGRESSIVE STATISTICAL IDS"; U.S. Ser. No. 14/831,565, titled "EXTENDING AUDIENCE REACH IN MESSAGING CAMPAIGNS USING PROBABILISTIC ID LINKING"; and U.S. Ser. No. 16/447,849, titled "AUTOMATED ENHANCEMENT OF OPPORTUNITY INSIGHTS", the entire contents for each of which are incorporated by reference as if set forth in their entirety.

TECHNICAL FIELD

The present disclosure relates to systems and methods for crawling the web to extract and verify entity location information to enhance location-based functionality in software applications and cloud services.

BACKGROUND

Many software systems and cloud services rely on accurate, structured location data to perform or enhance application-specific functions. One approach for obtaining location data from entities is an opt-in service whereby entities are relied upon to proactively submit and update location data through an online interface when registering with the service. For some applications, this approach may not be sufficiently comprehensive, as many entities for which a profile exists may not have registered with the service. Further, even for entities that have registered, the submitted location data is not always accurate due to manual data entry errors, entity address changes, and/or entity dissolution, among other reasons. Applications operating on inaccurate location data may produce sub-optimal output, such as poor analytics and data-driven actions that are ineffective or even harmful.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4A illustrates an example user interface for an entity profile with an account score determined based in part on automatically extracted location information in accordance with some embodiments;

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. CUSTOM WEB CRAWLER FOR EXTRACTING LOCATION INFORMATION
4. VERIFICATION ANALYTICS AND QUEUEING
5. LOCATION-BASED PROFILE SCORING AND APPLICATION INTEGRATION
6. COMPUTER NETWORKS AND CLOUD NETWORKS
7. MICROSERVICE APPLICATIONS
8. HARDWARE OVERVIEW
9. MISCELLANEOUS; EXTENSIONS

1. General Overview

Techniques are described herein for automatically extracting and verifying structured location data for an entity profile. The location information may be consumed by one or more cloud services and/or other applications to perform or enhance application-specific functionality. For example, an enterprise software application or suite of applications may consume the location data to provide actionable insights into opportunities in a pipeline based on current entity locations. Opportunities may be sorted, filtered, and/or automatically divided/distributed among representatives in a location-aware manner to optimize the likely outcomes for actions taken for those opportunities. As another example, a software application or cloud service may consume the location data to provide logistical analytics and automatically route fulfillment requests to locations to optimize fulfillment times. Other applications may similarly consumer the location data to perform other location-dependent or location-aware functions.

Maintaining the integrity and reliability of location data presents several technical challenges. Manually entered location data is prone to data entry errors and, in some cases, fraudulent entry. A service may leverage a web search engine in an attempt to automatically extract location data. However, a given entity may have several addresses listed in the broad corpus of documents available through the World Wide Web. Some of the results may be outdated, submitted by unreliable sources, and/or otherwise subject to inaccuracies. Thus, it may be difficult to determine which location data, if any, returned by a general search engine provides a reliable address for a given entity. Further, generalized search engines crawl a large corpus of documents, many of which may be unreliable, leading to inefficiencies and suboptimal results for applications that target specific entity locations.

In some embodiments, a custom web crawler is configured to perform targeted data scraping on a set of websites that are associated with one or more entities, such as businesses, educational institutions, and/or other organizations. The web crawler may target specific websites in a manner that enhances application-specific functions by providing accurate and current location information for relevant entities. The web crawler may analyze the structure of an entity's website and/or individual webpages that belong to the website to identify patterns that are indicative of reliable location information. Once a location is identified, the web crawler may extract the information from the website, tokenize or otherwise structure the data, and add the structured location data to an entity profile.

In some embodiments, the web crawler is configured to account for uncertainty in the extracted location information. For instance, the web crawler may analyze and/or extract information that may be used to determine the reliability of the extracted location information. Reliability may be determined, in part, on the patterns used to identify the location information. Additionally or alternatively, other patterns and/or factors may be analyzed by the web crawler to determine the reliability of the extracted location information. The crawler may automatically generate a score for the extracted location information that is indicative of reliability.

In some embodiments, the crawler may use the reliability score and/or other factors to filter addresses identified in an entity's website that are not relevant to the entity's profile. For example, the crawler may be configured to target the location of an entity's headquarters for the entity profile. The entity's website may include several addresses including the address for the headquarters. addresses for satellite offices, partner offices, post office boxes, and/or other locations. The crawler may classify the address for the location most likely to be the headquarters using the scoring system and add it to the entity profile. The other addresses may be excluded from the profile or included in a separate section of the profile or one or more sub-profiles that are nested under the profile to include details about other offices (e.g., a satellite office address, number of employees at the satellite office, etc.).

In some embodiments, the reliability score may be used to automatically verify the location information of an entity. For example, if the reliability score is above a threshold, then a flag in the entity profile may be set to indicate that the location was automatically verified. If the reliability score is below the threshold, then location information may be required to undergo verification procedures before the verification flag is set.

In some embodiments, the crawler may detect conflicts between location information in an entity profile and location information extracted from the entity's website. This situation may occur, for instance, where a user manually entered in location information into the entity profile, differing location information is extracted from another source, or the entity's address changes. If a conflict is detected, then crawler may raise a flag and/or add the profile to a queue to verify the extracted location information. Conflict resolutions rules may be applied to address the conflict, or the entity profile may be required to undergo manual review for verification.

In some embodiments, the location information is synchronized to records in client systems, such as an enterprise application or external cloud service. Client systems may subscribe to a service to have their database records updated as new location information is extracted and verified. If location information is pending verification, then the update may be prevented and/or the client system may be notified until verification is obtained.

In some embodiments, client systems are able to programmatically match entities and enrich data based at least in part on the extracted location information. For example, a client may submit a query through an endpoint to find all entities within a particular state or other region that have a total headcount over a threshold. The query may be evaluated against the entity profiles to find and return entity information that satisfy the query criteria. The client system may use the entity information to enrich data and/or perform application-specific functions, as described further herein.

One or more embodiments described in this Specification and/or recited in the claims may not be included in this General Overview section.

2. System Architecture

Figure 1:
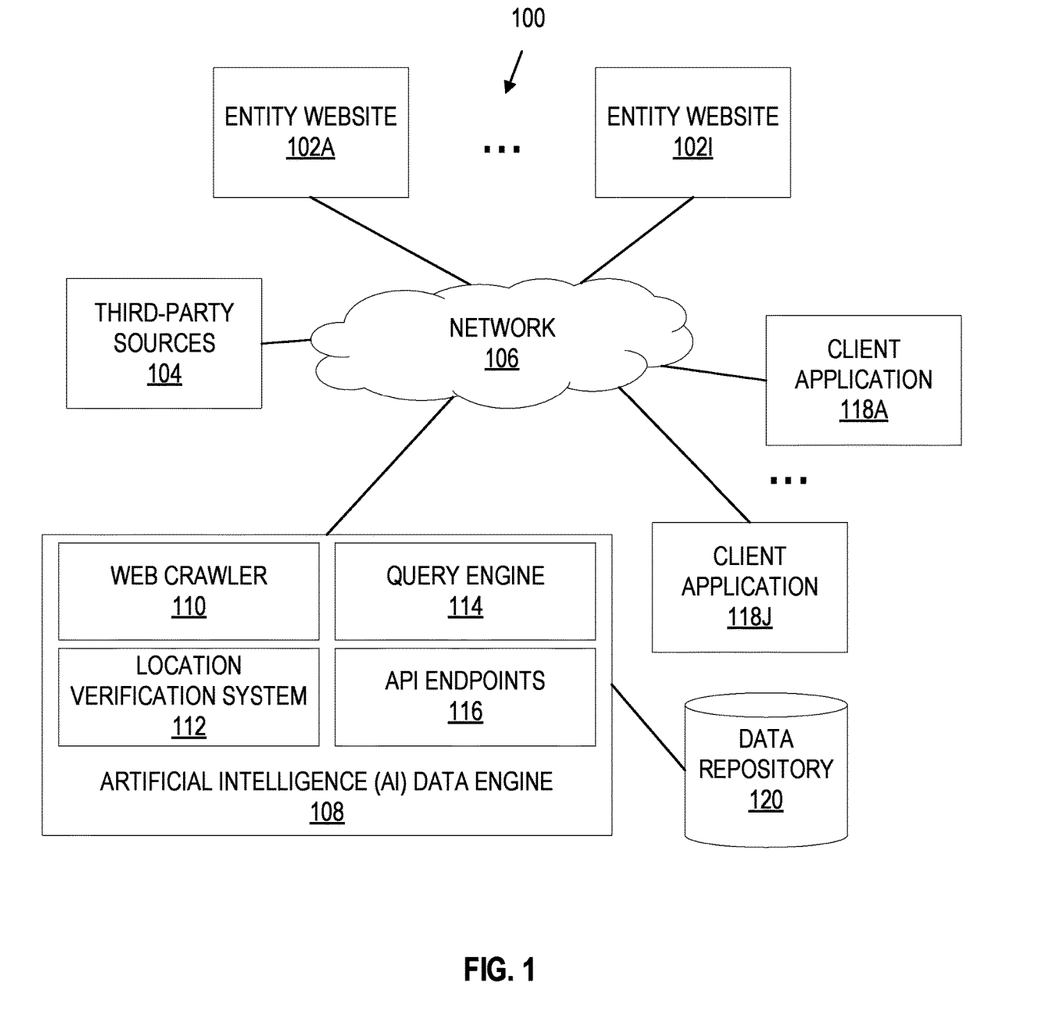
FIG. 1 illustrates a system in accordance with some embodiments.

FIG. 1 illustrates system 100 for extracting and verifying location information in accordance with one or more embodiments. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Referring to FIG. 1, system 100 includes entity websites 102a-i, third party sources 104, artificial intelligence (AI) data engine 108, and client applications 118a-j, which are communicatively coupled via network 106. Network 106 represents one or more data communication networks, such as the Internet. The different subsystems within system 100 may communicate over network 106 using one or more communication protocols, including protocols belonging to the Internet Protocol (IP) suite.

In some embodiments, AI data engine 108 is configured to automatically extract and manage entity-level data and signals. AI data engine 108 may use natural-language processing, machine learning, and/or other techniques to extract entity data and verify that the data is accurate. The data may be consumed by client applications 118a-j for various application-specific functions.

In some embodiments, AI data engine 108 includes web crawler 110, location verification system 112, query engine 114, and application programming interface (API) endpoints 116. Web crawler 110 may be configured to scrape location data from entity websites 102a-i. For example, web crawler 110 may fetch webpages from entity websites 102a-i via network 106 using the Hypertext Transfer Protocol (HTTP) and/or other communication protocols of the IP suite. Web crawler 110 may be configured to restrict scraping to a subset of web pages based on predetermined or learned patterns to minimize the resources consumed on the visited systems. Further, web crawler 110 may be configured to follow the robots exclusion protocol, as encoded in a robots.txt file, for each visited website to prevent web crawler 110 from processing areas of a website that have been classified as restricted from crawling.

Location verification system 112 may analyze the location data extracted by web crawler 110 and/or provided through manual data entry to verify the accuracy of the data. In some embodiments, location verification system 112 may compare the location information to location data received from third-party sources 104, if any. Additionally or alternatively, location verification system 112 may determine/assign a reliability score as a function of various factors. The verification score may affect the functions taken by one or more components of AI data engine 108 and/or client applications 108*a-j* with respect to an entity profile, as described in further detail in the sections below.

In some embodiments, location verification system 112 is configured to detect conflicts between location information. A conflict may arise when location information extracted by web crawler 110 for an entity does not match location information from another source, such as location data manually input through a data entry application or location data from third-party sources 104. If a conflict is detected, location verification system 112 may execute conflict resolution procedures, such as flagging the entity profile for further review.

Query engine 114 processes inbound requests from client applications 118*a-j*. Example queries may include a "match entity" query that seeks current, accurate information on entities that match specific criteria, which may include location-based criteria. As another example, a "find similar entity" query may search for entities that are similar to a provided entity. The similarity measure may factor in the primary location of an entity.

API endpoints 116 provide communication channels through which client applications 118*a-j* may invoke functions of AI data engine 108. For example, client applications 118*a-j* may submit HTTP requests that invoke the "match entity", "find similar entity", and/or other functions to enrich data. As another example, client applications 118*a-j* may query entities that have a relevancy score to a particular application-specific function, where the relevancy score may be based in part on the primary location of the entities.

In some embodiments, the endpoints are Representational State Transfer (REST) based endpoints that allow for stateless operations between client applications 118*a-j* and AI data engine 108. For instance, an API endpoint may be associated with a uniform resource identifier (URI) for submitting requests. Client applications 118*a-j* may submit HTTP requests to the corresponding URIs to invoke functions that are exposed by AI data engine 108.

In some embodiments, API endpoints 116 include an endpoint for interacting with third-party sources 104. Third-party sources 104 may provide access to information that may or may not also be on entity websites 102*a-i*. Third-party sources 104 may be restricted to sources that are trusted to provide accurate information. Third-party sources 104 may include, but are not limited to, government servers (e.g., the Security and Exchange Commission's (SEC's) Electronic Data Gathering, Analysis, and Retrieval system), third-party business intelligence (BI) systems, and news websites. One or more of third-party sources 104 may be paid subscription services. AI data engine 108 may access such services using authentication protocols, such as OAuth, which may AI data engine 108 with secure delegated access to server resources available through the subscription service.

Data repository 120 may store and provide access to data for AI data engine 108. In some embodiments, data repository 120 stores entity profiles for entities that are subject to targeted actions by client applications 118*a-j*. Data repository 120 may be any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or may execute on the same computing system as AI engine 108. In other embodiments, data repository 120 may be implemented or executed on a computing system separate from AI engine 108. Data repository 120 may be communicatively coupled to AI data engine 108 via a direct connection or via network 106.

Client applications 118*a-j* may be any applications that may benefit from invoking functions and consuming data provided by AI data engine 108. In some embodiments, client applications 118*a-j* include one or more customer relationship management (CRM) systems. A CRM system may synchronize database records with the entity profiles stored in data repository 120 to help ensure that the application is operating on accurate, up-to-date intelligence about an entity. For example, accurate location information may help ensure that opportunities that are most likely to be successful are taken and routed to the appropriate CRM users (e.g., representatives that are geographically located in and/or assigned to the same location). An example CRM system is further described in U.S. application Ser. No. 16/447,849, titled "AUTOMATED ENHANCEMENT OF OPPORTUNITY INSIGHTS", which was previously incorporated by reference.

Additionally or alternatively, client applications 118*a-j* may include other types of applications. For example, a social media relationship management system (SRM) may select a post that is directed to or includes content about a target entity based on the primary location of the target entity. As another example, an SCM system may automatically route goods to fulfilment centers nearest an entity. In yet another example, a bid management application may automatically screen/filter bids that originate from entities with headquarters in a particular location.

In some embodiments, client applications 118*a-j* include frontend interfaces for interacting with end users. A frontend interface may render user interface elements and receive input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In some embodiments, different components of an interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface xyz is specified in one or more other languages, such as Java, C, or C++.

In some embodiments, AI data engine 108 represents a cloud service, with client applications 118*a-j* corresponding to different tenants that share access to resources exposed by the cloud service, such as the entity profiles. Different tenants may be independent from each other. For example, client applications 118*a-j* may be associated with accounts registered to different corporations, organizations, and/or other entities. Client applications 118*a-j* may access AI data engine 108 using different authentication credentials. Further, AI data engine 108 may maintain the anonymity the tenants such that the tenants are prevented from accessing any information that reveals the identify of another tenant. For instance, AI data engine 108 may prevent a tenant from viewing information about the names of the other organization accessing the data and the hostnames and IP addresses of resources belonging to other tenants that are accessing the API endpoints 116. Thus, each tenant may access auto-verified location data for entities to integrate with application-specific functions in a manner that is both secure and anonymous.

In some embodiments, the components of system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Additional embodiments and/or examples relating to computer networks and microservices are described below in Section 6, titled "Computer Networks and Cloud Networks", and Section 7, titled "Microservice Applications", respectively.

3. Custom Web Crawler for Extracting Location Information

As previously mentioned, web crawler 110 may be configured to scrape location information from entity websites 102a-i. Web crawler 110 may restrict scraping to a limited set of websites based on which entities are subject to potential actions from client applications 118a-j. Further, scraping of an entity website 102a-i may be restricted to a subset of webpages within the website that follow predetermined or learned patterns. The restrictions may reduce the overhead of scraping for web crawler 110, as the number of resources that are scraped is limited to a much smaller set than the entire corpus of the World Wide Web or large subsets thereof. The restrictions may also reduce the overhead on webservers hosting entity websites 102a-i as the number of pages accessed may be limited to a relatively small subset. Further, the techniques may also yield benefits in the accuracy of location information extracted, as scraping may target patterns linked to reliable data.

Figure 2:
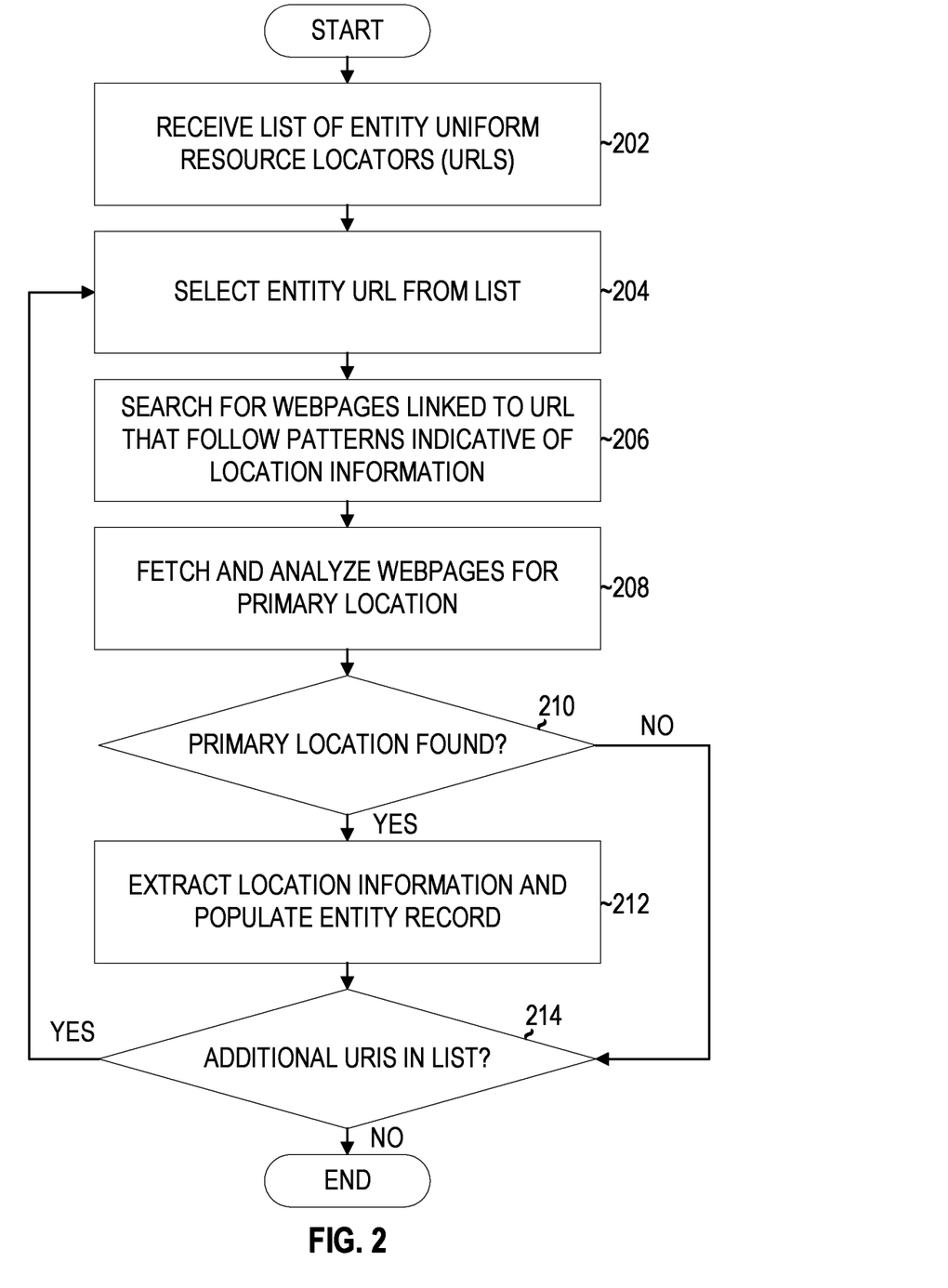
FIG. 2 illustrates an example set of operations for crawling websites to extract location information for an entity profile in accordance with some embodiments.

FIG. 2 illustrates an example set of operations for crawling websites to extract location information for an entity profile in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

Referring to FIG. 2, web crawler 110 receives a list of uniform resource locators for a set of target entities (operation 202). In some embodiments, the entities are ones that are the targets of actions by client applications 118a-j. For example, the entities may include companies that are the subject of opportunities within an opportunity pipeline of a cloud service or application. The list of URLs may be manually curated and/or determined automatically by AI data engine 108 or through some other means.

Web crawler 110 further selects an entity URL from the list (operation 204).

Web crawler 110 next searches for webpages linked to the URL that follow patterns indicative of location information (operation 206). In some embodiments, web crawler 110 analyzes the structure/hierarchy of the website to search for webpages that are likely to include reliable location information. For example, company websites may often include location information on webpages detailing career opportunities or presenting contact information. To find this information, a web crawler 110 may look for hyperlinks and/or webpages that include terms such as "career", "jobs", "contact us", "visit us", "location" and/or other relevant terms. The patterns may be hard coded or learned based on training examples fed to a machine-learning model.

Web crawler 110 next fetches and analyzes the identified webpages for a primary location of the entity (operation 208). Web crawler 110 may restrict the analysis to webpages with content and/or hyperlinks matching the patterns as identified in operation 206. In some embodiments, the primary location is the company or other entity's headquarters. Web crawler may parse the webpages for address patterns, such as by searching for state codes, country codes, and other common address tokens.

Based on the analysis, web crawler 110 determines whether a primary location is found (operation 210). In some embodiments, web crawler 110 implements a natural language processing (NLP) model to analyze the content of websites. Generally, NLP models are designed to extract meaning based on a language's linguistic syntax. However, the NLP model implemented by web crawler 110 may further account for other syntactic and/or semantic elements tailored to extracting meaning from location data. For example, as previously indicated, certain webpage features, such as terms within a hyperlink and/or the text of a website, might be indicative that a webpage or region therein includes or does not include primary location information. The NLP model may account for such features, via a hard-coded set of rules or through a statistical, machine-learning based approach.

Additionally or alternatively, web crawler 110 may be configured to recognize address patterns for different countries/regions. Different sets of rules may be applicable for different countries or regions. For example, some countries include the zip code before the town/city while other countries include the town/city before the zip code. In this example, the NLP model may include a country format mapping table that stores name(s), code(s), or abbreviation(s) of a country as well as a plurality of address formats used for that country. The country format mapping table may also be updated to add probabilities for each of the different address formats for that country based on addresses that have already been detected and/or verified. The probabilities can be used to predict which format is being used in a given scenario for the country at issue (as detected based on the presence of a country code, name, or abbreviation). The NLP model may be configured to automatically determine and select which country rules are applicable based on what tokens (e.g., country names, state names, province names) the location data includes and/or how the location data is formatted (e.g., how a sequence of tokens is ordered, zip code length and prefix, what language is used for the address).

In some embodiments, the NLP model is configured to classify candidate location information as a valid or invalid primary address. Candidate location information may initially be extracted by web crawler 110, which parses a website for tokens that are indicative of encoding location information for an entity. For example, web crawler 110 may parse the data for states, provinces, countries, zip codes, and/or other known tokens indicative of an address. NLP model may then analyze the candidate tokens and/or surrounding tokens for any of the aforementioned patterns, which may include rule-based and/or automatically learned patterns.

In some cases, the NLP model may discard candidate location data based on the analysis. For example, the text "San Jose" may initially be identified and extracted from a web page. However, the adjacent text may lack an address number, street name, and/or other tokens that are included in a complete address. In other cases, a full address may be included, but the NLP model may determine that the address is for a satellite office or a location other than the primary address.

If the primary location is found, then web crawler 110 extracts the location information and populates an entity records (operation 212). In some embodiments, web crawler 110 is configured to tokenize/tag different portions of an extracted address. For example, web crawler 110 may independently tag/tokenize the address number, street name, city, zip code, state/province, country, etc. Independent tags on different tokens may allow for more powerful and optimized querying and analytics on the data. For instance, a query may be submitted to fetch all companies with more than 100 employees within a particular zip code. A query execution engine may leverage the tags to quickly identify which database records/entities profiles are mapped to a given zip code without having to perform a full scan and parse of all entity records.

In some embodiments, web crawler 110 standardizes the address to bring the location information into a common format within the entity records. For example, the abbreviation "Blvd." may be transformed to "Boulevard". As another example, a shortened five-digit zip code for a U.S. address may be expanded to the full nine-digit version based on the street address of the entity.

Once the primary location has been found or if no primary location could be identified, web crawler 110 next determines whether there are any additional entity URLs in the list (operation 214). If so, then web crawler 110 may return to operation 204 and repeat the process, iterating through the remaining entity URLs. After all the URLs have been analyzed, the process may end.

In some embodiments web crawler 110 is configured to periodically repeat the process depicted in FIG. 2. For example, web crawler 110 may search on a weekly, monthly, or any other periodic basis. This helps to ensure that the location information in the entity profile records is current and accurate. Additional information may become available as entity websites are modified and/or move locations. Further, the list of URLs may change as new entities arise and existing entities evolve.

4. Verification Analytics and Queueing

There may be a level of uncertainty in the location information extracted using automated bots. As an example, there is a possibility that web crawler 110 scrapes the address of a satellite office, a separate company, or a location other than an organization's headquarters. Additionally or alternatively, web crawler 110 may scrape multiple addresses from an entity's website without any explicit indication of which address is the headquarters.

Manually entered data may also be subject to errors. For example, a user may have input an address for an entity in error or the entity address may have changed since submitted by the user.

In some embodiments, location verification system 112 is configured to determine the reliability of location information that has been automatically extracted and/or manually entered. For example, location verification system 112 may assign a score based on one or more factors indicative of the reliability/accuracy of the data. If the score satisfies a threshold, then location verification system 112 may add an indication to the corresponding entity profile that the location information was automatically verified. If the score is below the threshold, then location verification system 112 may add the entity profile to an auditing queue to undergo further review before the location information is verified.

In some embodiments, the score is based on patterns detected by web crawler 110. For example, if the location information is tagged "Headquarters", then web crawler 110 may infer that the information is more likely to be accurate. As another example, the company address may be frequently included in multiple webpages, such as in the footer. In yet another example, the webpage where the location was extracted relative to a website hierarchy may factor into the score. For instance, an address extracted from a "Contact Us" page may be more reliable than other pages. In yet another example, the score may be determined based at least in part on an address format used for the address in light of a likelihood that the address would be used for the primary location in comparison with other address formats on a web site. For instance, the address for the headquarters may be more formally formatted than other addresses on the website (e.g., including a more complete set of information, spaced/tabulated a certain way, etc.).

In some embodiments, third-party sources 104 may augment the score. For example, AI data engine 108 may be configured to periodically extract entity information from the SEC's Electronic Data Gathering, Analysis, and Retrieval system and/or other third-party sources. If the primary location within an entity profile can be matched to the SEC records and/or other BI sources, then location verification system 112 may determine that the information is accurate. Any of the factors may be given equal weight (e.g., a voting based classification) or may be weighted differently, depending on the particular implementation. In some embodiments, one or more weights may be configurable and assigned by an end user, such as a domain expert. Additionally or alternatively, one or more weights may be assigned by a machine learning model as described further herein.

If multiple addresses are scraped by web crawler 110 then the score and/or the comparison with third-party sources may be used to select a primary location for the entity. For example, the location with the highest score and/or the one that matches with the most third-party sources may be selected.

Additionally or alternatively, location verification system 112 may be configured to resolve conflicts that arise between the primary location information extracted by web crawler 110 and the primary location information in the entity profiles. A conflict may arise when the two items do not match.

Figure 3:
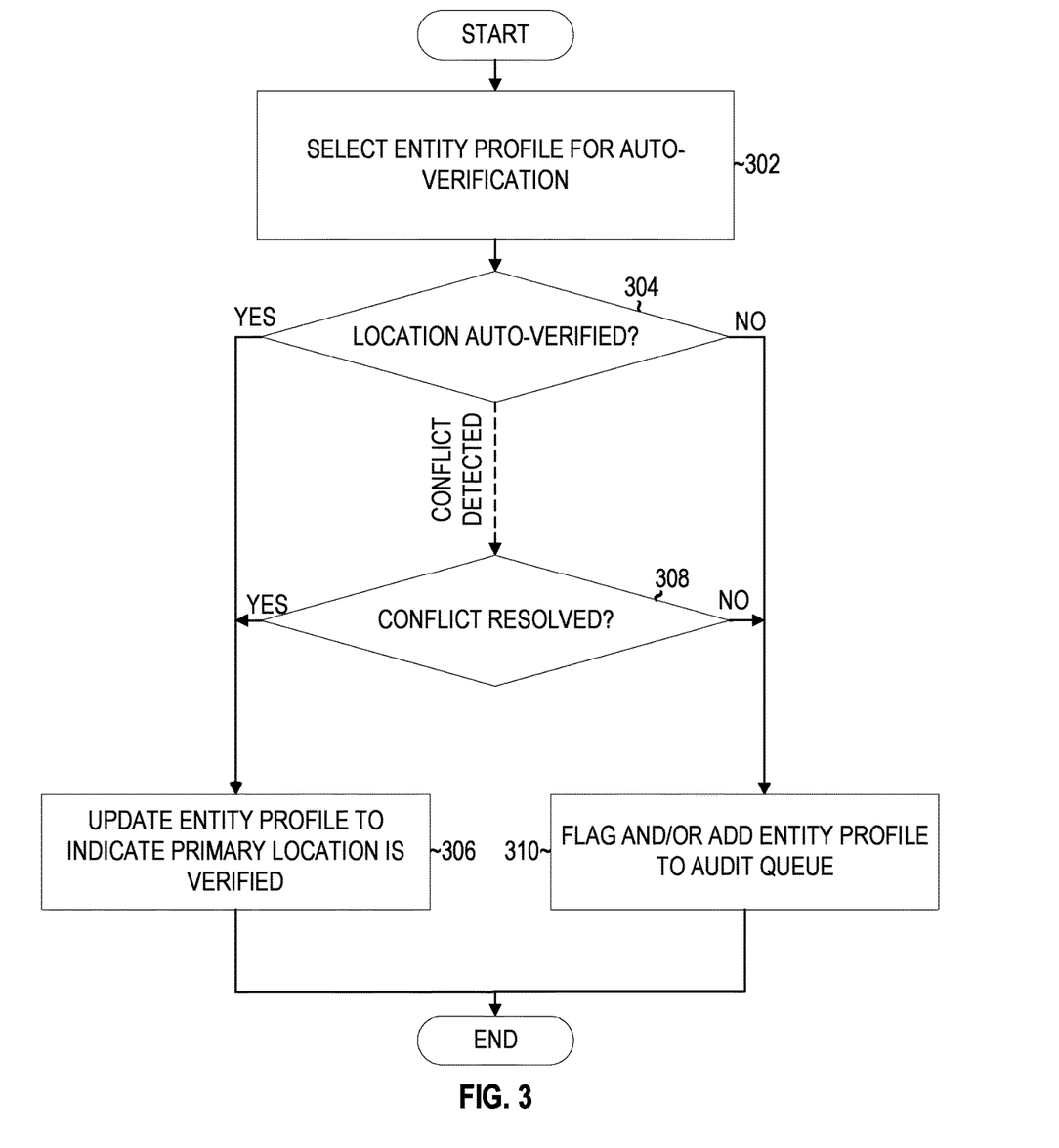
FIG. 3 illustrates an example set of operations for automatically verifying location information in accordance with some embodiments in accordance with some embodiments.

FIG. 3 illustrates an example set of operations for automatically verifying location information in accordance with some embodiments. One or more operations illustrated in FIG. 3 may be modified, rearranged, or omitted all together. Accordingly, the particular sequence of operations illustrated in FIG. 3 should not be construed as limiting the scope of one or more embodiments.

Referring to FIG. 3, the process includes selecting an entity profile for location verification (operation 302). The entity profile may include location data that was previously extracted by web crawler 110, submitted by a third-party source, manually entered, or obtained in some other manner. As previously mentioned, the location data for a given entity may be associated with a verification flag. In some embodiments, the verification flag for the selected entity profile is not set to indicate that the location is not currently auto-verified. In other cases, the process may be executed for profiles even if the verification flag is set.

The process further attempts to automatically verify the location data in the entity profile (operation 304). In some embodiments, this operation comprises scraping an entity website associated with the profile using web crawler 110. Web crawler 110 may use the pattern and/or rule-based pattern analytics described in the previous section to determine whether a primary location is able to be extracted. Additionally or alternatively, one or more of third-party sources 104 may be queried for location data. The automatically extracted location data may then be compared with the location data stored in the entity profile.

In some embodiments, the auto-verification process includes analyzing on one or more of the reliability factors previously mentioned. For example, if the primary location extracted by web crawler 110 matches with the company's address extracted from SEC filings and the address in the entity profile, then it may be inferred that there is a high probability that the data is accurate. If one or more of these data points conflict, however, then location verification system 112 may determine that an automatic verification is not possible.

In some embodiments, the auto-verification process may analyze the normalized position of scraped location data in comparison to other normalized positions in the website. For example, it may be inferred from learned patterns that location data scraped from a "contact us" tab, "location" tab, or "visit us" tab has a higher probability of being a primary location than location data scraped from an "events" tab. Further, the "contact us" tab may be assigned a higher, equal, or lower weight than the "location tab" and/or "visit us" tab depending on the learned patterns. A cumulative weight/probability may be computed based on the presence/absence of such features. In some embodiments, reliability scores are computed by forming an ML feature vector, which may be input into a trained ML model. The ML model may then output a score as a function of the weights applied to the input feature vector, where the score represents the likelihood that the location data is the primary location for a target entity.

In some embodiments, the auto-verification process compares a reliability score for extracted location data to a threshold. The reliability score may be computed as a function of one or more feature weights, as previously indicated. The weights may be hard-coded or may be assigned through machine learning techniques. If the reliability score is above a threshold, then then the verification flag may be set. Otherwise, the location data may be flagged for further review.

If a reliable primary location is able to be extracted, then the auto-verification process updates the entity profile to indicate that the location was verified (operation 306). In some embodiments, this operation comprises setting a flag associated with the entity profile. Consuming applications and queries may check the flag to determine whether the location information is verified. As described further below, one or more actions directed to an entity may be contingent on whether the location is verified or not.

In some embodiments, a verification flag, once set, may be associated with a time to live value. For example, the verification flag may remain valid for only a day, week, month, or some other time period. If the time period has lapsed, the verification flag may be set to false to indicate that the location data is no longer verified. The auto-verification process may be periodically re-executed to maintain the verified status of an entity profile. In the event that the address can no longer be verified, such as due to an entity address change, then the verification flag may be reset.

In the event a conflict is detected between an entity profile location and an automatically extracted location, then the process determines whether the conflict may be automatically resolved (operation 308). A conflict may arise when the profile location address, either manually entered or automatically extracted on a previous occasion, does not match with one or more of the primary location addresses extracted during the auto-verification process. In some embodiments, location verification system 112 may be configured to attempt to automatically resolve any detected data conflicts. However, auto-resolution may be disabled or otherwise unavailable in some implementations.

If auto-resolution is not enabled or the conflict could otherwise not be resolved, then the entity profile is added to an audit queue (operation 310). The audit queue may be accessible to one or more auditors, which may provide manual review and verification of the data. The conflict may be flagged and/or described in the audit queue entry. For example, the entry may present the conflicting addresses with an indication that the location could not be verified.

Additionally or alternatively, the verification flag may be reset at operation 310 if it was previously set. This scenario may occur where the address was previously verified but, due to a change in extracted primary location data from the previous auto-verification iteration, the address is no longer able to be automatically verified.

If the auto-resolution process resolved the conflict, then the entity profile may be updated to include the verified primary location and/or to indicate that the location was verified (operation 306).

In some embodiments, the auto-resolution process may evaluate conflict resolution rules to determine whether to automatically override or verify a primary entity location. The determination may be done based in part on one or more of the aforementioned reliability factors. For example, if the extracted location from an entity website matches SEC filings and the SEC filings reflect a recent entity address change, then the address may have a high reliability score. A previous, conflicting address within the entity profile may accordingly be replaced. The auto-verification flag may also be set, or the new address may be submitted for further review. As another example, the reliability score for a conflicting primary address may be below a threshold. In response, the entity profile may be flagged for audit.

The process above may help streamline and reduce auditor, as only entity profiles that could not be automatically verified are added to the queue with the conflict highlighted. In other embodiments, entity profiles may be prioritized and/or sorted based on reliability. For example, the records with the lowest reliability score may rise to the top of the queue to correct the data that is most likely to be inaccurate in a timely manner.

5. Location-Based Profile Scoring and Application Integration

In some embodiments, auditor feedback is used as feedback to a machine-learning model. Auditors may manually mark location data in entity profiles as verified or incorrect. The entity profiles may then be used as labeled examples that may be used to train, re-train, and/or tune machine learning (ML) models. Example ML models that may be trained include, but are not limited to, artificial neural networks, support vector machines (SVMs), random forest walkthroughs, and statistical NLP models.

In some embodiments, the process assigns and updates feature weights based on auditor feedback. Example features may include, but are not limited, the presence or absence of certain tokens within a webpage (e.g., "Headquarters", "HQ", country name, zip code, etc.), the order in which the tokens appear, the presence or absence of tokens within a URL for the webpage (e.g., "Contact", "Join Us", etc.), the normalized position of the location data within a webpage (e.g., from which tab the location data was scraped), the language of the webpage, and/or other semantic/syntactic attributes. In the context of a neural network, a set of weights may be initially assigned to various features. Gradient descent may then be used to adjust the feature weights until a set of weights is identified that yields the lowest prediction error as determined by an error function. Other machine learning models may similarly adjust weights for the other features to minimize error. For example, a probabilistic support vector machine (SVM) may recompute the boundaries of a hyperplane to minimize a loss function, where the feature weights are determined by the boundaries. The weights may subsequently be adjusted and tuned as more auditor feedback is received. The ML model weights may be applied to new examples when analyzing location information on an entity website to assign a probabilistic score that the location information represents the primary location for the entity. The score may be used to populate entity records, automatically verify location data, and/or automatically resolve conflicts as previously described.

Additionally or alternatively, AI data engine 108 may be configured to assign scores to entity profiles themselves using a scoring model that accounts for location information. A score may represent a predicted likelihood that target actions taken by client applications 118*a-j* will have a positive outcome. For example, the scores may be used to prioritize opportunities in an opportunity pipeline based on predicted likelihood success.

FIG. 4A illustrates example user interface 400 for interacting with an entity profile that has an account score determined based in part on automatically extracted location information in accordance with some embodiments. User interface 400 presents display pane 402, which includes an overview of a selected company. The overview includes several items of information from the entity profile including:
- an exit status with subsidiary information that links to the parent company;
- total revenue;
- a similar web rank;
- an address for the company's headquarters;
- the total number of employees;
- the total pending revenue raised;
- the name of the parent company;
- the date the company was founded;
- the CEO name;
- the primary industry category; and
- an industry sub-category.

The address field in user interface 400 may be populated with information scraped by web crawler 110 from the company's website. The user interface may link the address to a mapping service such that a user may be shown the location in a map upon clicking or otherwise selecting the link.

The overview section of the user interface further includes a checkmark next to each item in the overview that was verified. In this example, the revenue, address, and employee counts were verified. If the location and/or other items were not able to be verified, then the check is not displayed to provide an indication to the user.

User interface 400 further includes display pane 404, which presents an account score with a list of factors that contributed to the score. For example, the top two contributors to the score are the technographics, based on the software/cloud services that the company uses, and the firmographic, which is based on the number of employees. The company location may also be a contributing factor. Companies in one location may be preferred for targeted actions by an application than companies in another location.

Figure 4B:
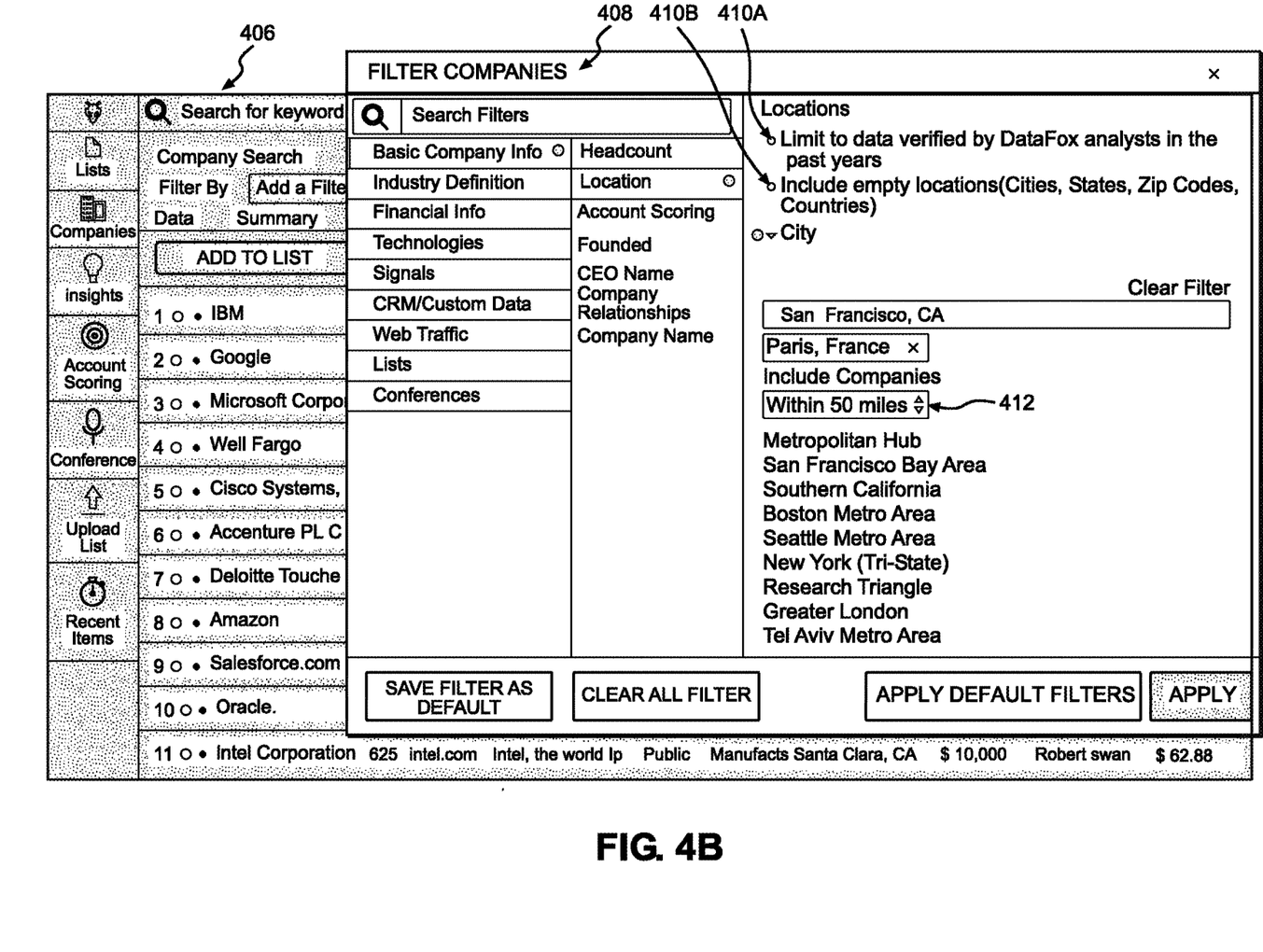
FIG. 4B illustrates an example user interface for filtering entity profiles based on location in accordance with some embodiments.

In some embodiments, query engine 114 may fetch entity profiles based on query criteria, which may include location-based criteria. For example, FIG. 4B illustrates example user interface 406 for filtering entity profiles based on location in accordance with some embodiments. User interface 406 includes query interface 408, which allows a user to filter by locations, such as city, state, country, zip code, street, etc. Query interface 408 includes drop-down menu 412, which allows a user to search for exact matches or for companies within a threshold distance of a specified location. Query interface 408 further includes checkboxes 410*a-b*, which allows the search to be limited to data that was verified within a threshold timeframe and/or to include profiles with empty locations. Other query criteria may also be specified, such as revenue, headcount, and/or other profile information.

In some embodiments, client applications 118*a-j* may invoke the above functions to query the entity profiles and consume the results. Client applications 118*a-j* may be configured to perform any application-specific functions based on the data. For instance, as previously indicated, the actions may include, without limitation, enriching data, prioritizing and routing opportunities for interacting with customers, selecting and posting targeted social media content, deploying resources, automatically routing goods to fulfilment centers, and synchronizing files.

In some embodiments, the actions may vary depending on whether a location has been verified or not. For example, AI data engine 108 may prevent the location from being synchronized or pushed to client applications until fully verified. As another example, the location may not factor into an account score for a given entity until verified. The above sections provide a non-exhaustive list of examples. Other applications may leverage AI data engine 108 to perform a variety of other functions, depending on the particular implementation.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
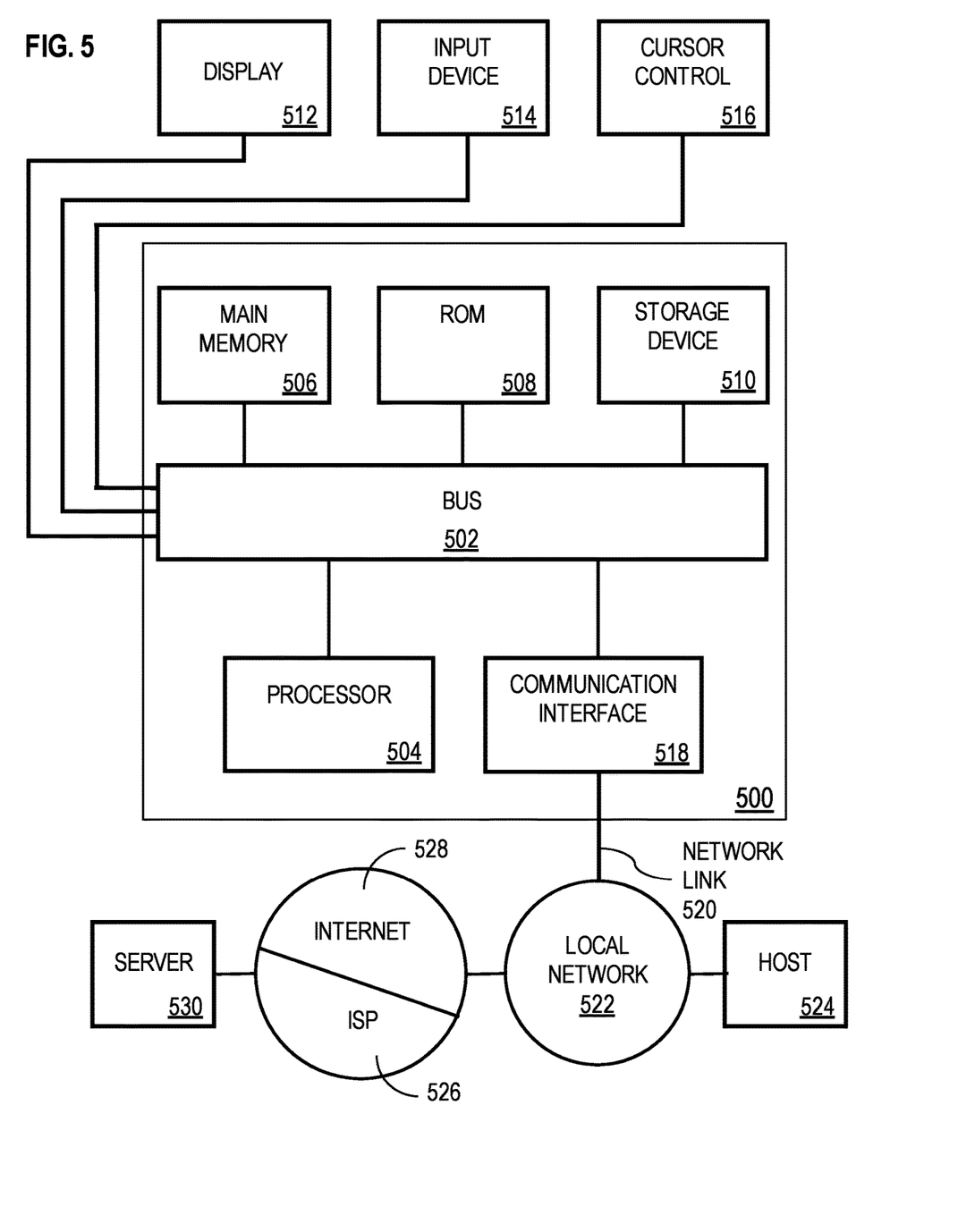
FIG. 5 shows a block diagram that illustrates a computer system in accordance with one or more embodiments.

For example, FIG. 5 is a block diagram that illustrates computer system 500 upon which an embodiment of the invention may be implemented. Computer system 500 includes bus 502 or other communication mechanism for communicating information, and a hardware processor 504 coupled with bus 502 for processing information. Hardware processor 504 may be, for example, a general purpose microprocessor.

Computer system 500 also includes main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes read only memory (ROM) 508 or other static storage device coupled to bus 502 for storing static information and instructions for processor 504. Storage device 510, such as a magnetic disk or optical disk, is provided and coupled to bus 502 for storing information and instructions.

Computer system 500 may be coupled via bus 502 to display 512, such as a cathode ray tube (CRT) or light emitting diode (LED) monitor, for displaying information to a computer user. Input device 514, which may include alphanumeric and other keys, is coupled to bus 502 for communicating information and command selections to processor 504. Another type of user input device is cursor control 516, such as a mouse, a trackball, touchscreen, or cursor direction keys for communicating direction information and command selections to processor 504 and for controlling cursor movement on display 512. Input device 514 typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 500 can receive the data on the network line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522.

For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    identifying, by a web crawler, a set of one or more uniform resource locators for a set of one or more respective websites, wherein the set of one or more uniform resource locators includes a first uniform resource locator for a first website associated with a first target entity;
    fetching, by the web crawler, a subset of webpages from the first website associated with the first target entity, wherein the web crawler restricts the webpages that are fetched from the first website based, at least in part, on patterns in keywords included in hyperlinks within the first website that are indicative of where reliable location information may be found;
    identifying, by the web crawler, a primary location of the first target entity within at least one webpage in the subset of webpages; and
    performing at least one of automatically verifying the primary location in an entity profile or populating the entity profile for the first target entity with the primary location.

2. The method of claim 1, further comprising determining, by the web crawler, an address pattern for the primary location of the first target entity; tokenizing, by the web crawler, different portions of the primary location based at least in part on the address pattern; wherein population the entity profile includes tagging the different portions of the primary location based on said tokenizing.

3. The method of claim 1, further comprising generating a score for the primary location that is indicative of a likelihood that the primary location is accurate.

4. The method of claim 3, wherein the score reflects a higher likelihood if the primary location matches location information extracted from a third-party source or an occurrence frequency in the subset of webpages is above a threshold.

5. The method of claim 3, further comprising automatically verifying accuracy of the primary location if the score satisfies a threshold; and adding the entity profile to a queue for manual review if the score does not satisfy a threshold.

6. The method of claim 3, wherein the score is determined based at least in part on a normalized position within a web site hierarchy, wherein the primary location was found in light of a likelihood that an address would be found in the normalized position in comparison to other normalized positions on a web site.

7. The method of claim 3, wherein the score is determined based at least in part on an address format used for the address in light of a likelihood that the address format would be used for the address in comparison with other address formats used on a web site.

8. The method of claim 1, further comprising detecting a conflict between the primary location identified by the web crawler for the first target entity and location information from another source; responsive to detecting the conflict, adding the entity profile to a queue for manual review.

9. The method of claim 1, further comprising receiving a query from a client application for entity profiles with a location that is verified and match a specified region; responsive to the query, returning the entity profile for the first entity only if the primary location is verified and matches or falls within the specified region.

10. One or more non-transitory computer readable media storing instructions which, when executed by one or more hardware processors, cause:
    identifying, by a web crawler, a set of one or more uniform resource locators for a set of one or more respective websites, wherein the set of one or more uniform resource locators includes a first uniform resource locator for a first website associated with a first target entity;
    fetching, by the web crawler, a subset of webpages from the first website associated with the first target entity, wherein the web crawler restricts the webpages that are fetched from the first website based, at least in part, on patterns in keywords included in hyperlinks within the first website that are indicative of where reliable location information may be found;

identifying, by the web crawler, a primary location of the first target entity within at least one webpage in the subset of webpages; and performing at least one of automatically verifying the primary location in an entity profile or populating the entity profile for the first target entity with the primary location.

11. The media of claim 10, wherein the instructions further cause determining, by the web crawler, an address pattern for the primary location of the first target entity; tokenizing, by the web crawler, different portions of the primary location based at least in part on the address pattern; wherein population the entity profile includes tagging the different portions of the primary location based on said tokenizing.

12. The media of claim 10, wherein the instructions further cause generating a score for the primary location that is indicative of a likelihood that the primary location is accurate.

13. The media of claim 12, wherein the score reflects a higher likelihood if the primary location matches location information extracted from a third-party source or an occurrence frequency in the subset of webpages is above a threshold.

14. The media of claim 12, wherein the instructions further cause automatically verifying accuracy of the primary location if the score satisfies a threshold;
and adding the entity profile to a queue for manual review if the score does not satisfy a threshold.

15. The media of claim 12, wherein the score is determined based at least in part on a normalized position within a web site hierarchy, wherein the primary location was found in light of a likelihood that an address would be found in the normalized position in comparison to other normalized positions on a web site.

16. The media of claim 12, wherein the score is determined based at least in part on an address format used for the address in light of a likelihood that the address format would be used for the address in comparison with other address formats used on a web site.

17. The media of claim 10, wherein the instructions further cause detecting a conflict between the primary location identified by the web crawler for the first target entity and location information from another source; responsive to detecting the conflict, adding the entity profile to a queue for manual review.

18. The media of claim 10, wherein the instructions further cause receiving a query from a client application for entity profiles with a location that is verified and match a specified region; responsive to the query, returning the entity profile for the first entity only if the primary location is verified and matches or falls within the specified region.

19. A system comprising:
one or more hardware processors;
one or more non-transitory computer-readable media storing instructions which, when executed by the one or more hardware processors cause:
identifying, by a web crawler, a set of one or more uniform resource locators for a set of one or more respective websites, wherein the set of one or more uniform resource locators includes a first uniform resource locator for a first website associated with a first target entity;
fetching, by the web crawler, a subset of webpages from the first website associated with the first target entity, wherein the web crawler restricts the webpages that are fetched from the first website based, at least in part, on patterns in keywords included in hyperlinks within the first website that are indicative of where reliable location information may be found;
identifying, by the web crawler, a primary location of the first target entity within at least one webpage in the subset of webpages; and
performing at least one of automatically verifying the primary location in an entity profile or populating the entity profile for the first target entity with the primary location.

* * * * *

UNITED STATES PATENT AND TRADEMARK OFFICE
CERTIFICATE OF CORRECTION

PATENT NO.         : 11,074,307 B2
APPLICATION NO.    : 16/865241
DATED              : July 27, 2021
INVENTOR(S)        : Walker et al.

Page 1 of 1

It is certified that error appears in the above-identified patent and that said Letters Patent is hereby corrected as shown below:

In the Specification

In Column 1, Line 12, after "U.S." insert -- Appl. --.

In Column 1, Line 14, after "U.S." insert -- Appl. --.

In Column 1, Line 15, after "U.S." insert -- Appl. --.

In Column 1, Line 18, after "U.S." insert -- Appl. --.

In Column 3, Line 37, delete "headquarters." and insert -- headquarters, --, therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*